United States Patent [19]
Nasato

[11] Patent Number: 5,632,967
[45] Date of Patent: May 27, 1997

[54] PROCESS FOR THE HIGH PRESSURE DEGASSING OF HYDROGEN SULFIDE FROM LIQUID SULFUR

[75] Inventor: Elmo Nasato, Tyler, Tex.

[73] Assignee: Goar, Allison & Associates, Inc., Tyler, Tex.

[21] Appl. No.: 531,186

[22] Filed: Sep. 19, 1995

[51] Int. Cl.$^6$ .................................................. C01B 17/02
[52] U.S. Cl. ................................. 423/578.1; 423/567.1; 423/573.1
[58] Field of Search .................... 423/578.1, 567.1, 423/572, 573.1, 574.2

[56] References Cited

U.S. PATENT DOCUMENTS

| | | | |
|---|---|---|---|
| 4,280,990 | 7/1981 | Jagodzinski et al. | 423/574 R |
| 4,419,337 | 12/1983 | Jagodzinski et al. | 423/574 R |
| 4,537,605 | 8/1985 | Gouw | 55/48 |
| 4,729,887 | 3/1988 | Pendergraft | 423/564 |
| 4,755,372 | 7/1988 | Baker | 423/578 R |
| 4,844,720 | 7/1989 | Pendergraft et al. | 55/73 |
| 4,849,204 | 7/1989 | Voirin et al. | 423/578 R |
| 4,857,297 | 8/1989 | Kettner et al. | 423/576.8 |

FOREIGN PATENT DOCUMENTS

| | | | |
|---|---|---|---|
| 964040 | 3/1975 | Canada | 423/578.1 |
| 50-28491 | 3/1975 | Japan | 423/578.1 |
| 63-35407 | 2/1988 | Japan | 423/578.1 |
| 1433822 | 4/1976 | United Kingdom . | |

OTHER PUBLICATIONS

Schicho, C.M., E.A. Watson, K.R. Clem, and D. Hartley, Exxon Research & Engineerging Co., "A New, Safer Method of Sulfur Degassing," CEP Oct. 1985, pp. 42–44.

Lagas, J.A., "Sulphur degasification," presented at the Gas Sweetening and Sulphur Recovery Seminar, Amsterdam—The Netherlands, Nov. 9–13, 1981, pp. 1–17.

Watson, E.A., D. Hartley, T.H. Ledford, Exxon Research & Development Laboratories, "Catalytically degas Claus sulfur," Hydrocarbon Processing, May 1981, pp. 101–103.

Lagas, J.A., "Stop emissions from liquid sulfur," Hydrocarbon Processing, Oct. 1982, pp. 85–89.

(Consulting Chemical Engineers) Goar, Allison & Associates, "Process Announcement for Shell Sulfur Degasification Process," Sep. 1991 7 pages; P.O. Box 131390 Tyler, Texas 75713-1390.

King, F.W., "$H_2S$ Removal from Liquid Sulphur," Energy Processing/Canada, Mar.–Apr., 1974, pp. 40–42.

King, F.W., "Taking $H_2S$ from liquid sulfur—why and how," The Oil and Gas Journal, Jun. 1974, pp. 164–165.

Goar, B. Gene, "Liquid Sulfur Degassing: A developing and Needed Technology," The Brimstone Sulfur Recovery Symposium, Vail, Co., Sep. 19–22, 1995.

*Primary Examiner*—Gary P. Straub
*Assistant Examiner*—Timothy C. Vanoy
*Attorney, Agent, or Firm*—Pretty, Schroeder & Poplawski

[57] ABSTRACT

Disclosed is a process for degassing liquid sulfur under pressure. A stream of liquid sulfur containing polysulfides and hydrogen sulfide and a stream of an oxidizing gas are introduced into a vessel and intimately mixed to provide intimate contact between the two streams. The streams are passed through the vessel at a pressure of at least about 40 psig and at a temperature and for a residence time sufficient to remove substantially all of the polysulfides and hydrogen sulfide from the liquid sulfur.

37 Claims, 2 Drawing Sheets

PROCESS FOR THE HIGH PRESSURE DEGASSING OF HYDROGEN SULFIDE FROM LIQUID SULFUR

BACKGROUND OF THE INVENTION

1. Field of the Invention

This invention relates to the chemical arts. In particular, it relates to a process for degassing liquid sulfur.

2. Discussion of the Related Art

An important process for removing hazardous hydrogen sulfide ($H_2S$) from various waste gases, including gases produced during the refining of petroleum products, is known as the Claus process. It involves the following net reaction:

$$H_2S + \tfrac{1}{2}O_2 \rightarrow H_2O + S \qquad (1)$$

Unfortunately, the handling of the liquid sulfur produced by plants using the Claus process can be extremely difficult. Many fires and explosions have occurred during the storage and transport of liquid sulfur, because of the accumulation of toxic and highly flammable $H_2S$ gas.

The $H_2S$ gas is produced by the gradual decomposition of polysulfides present in the liquid sulfur as represented by the following equation:

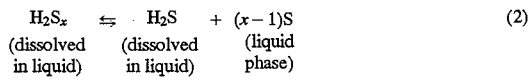

$$\begin{array}{ccc} H_2S_x & \rightleftharpoons & H_2S & + & (x-1)S \\ \text{(dissolved} & & \text{(dissolved} & & \text{(liquid} \\ \text{in liquid)} & & \text{in liquid)} & & \text{phase)} \end{array} \qquad (2)$$

The dissolved $H_2S$ then passes into the gas phase by physical desorption.

$$\begin{array}{ccc} H_2S & \rightarrow & H_2S \\ \text{(dissolved} & & \text{(gas phase)} \\ \text{in liquid)} & & \end{array} \qquad (3)$$

Consequently, to be successful, a degassification process must not only remove $H_2S$, but must also remove polysulfides, to prevent the subsequent generation of additional $H_2S$.

It is a disadvantage of modern, commercial degassification processes that they require large, complex and, accordingly, expensive equipment. For example, in one process, known as the Shell process, degassing takes place in a storage tank or sulfur pit equipped with stripping columns, where liquid sulfur is vigorously agitated by bubbling air therethrough at atmospheric pressure. The stripping columns are open at their tops and bottoms to allow the sulfur to circulate at a rate of a few hundred times per hour. The bubble air, together with an additional flow of air, is then used as a low pressure sweep gas to displace the gases produced by the degassification process. The low pressure gases so produced are then fed to an incinerator where the $H_2S$ is oxidized to $SO_2$ and released to the atmosphere. Depending on the design, a liquid or gaseous catalyst, such as ammonia, ammonium thiosulfate, urea, morpholine, or an alkanol amine may be added for accelerating the decomposition of the polysulfide into $H_2S$.

In an alternative process, known as the SNEA process, degassing takes place by repeated circulation and spraying of the liquid sulfur into the sulfur pit. Release of dissolved $H_2S$ is achieved by spraying liquid sulfur through jets at a specific velocity. Ammonia, injected at the suction of the recirculation pump, is typically used as a catalyst. After the $H_2S$ gas is released, it is removed by a sweep gas and fed to an incinerator. Both the stripping columns used in the Shell process and the circulation/spraying equipment used in the SNEA process are costly and require a large amount of space. Further, it is a disadvantage of both processes that they require the additional step of having to incinerate the $H_2S$-containing sweep gases.

It is another disadvantage of modern, commercial degassification processes that they require a relatively long retention time in the sulfur pit. For example, the Shell process typically requires the liquid sulfur to be recirculated through the stripping columns for about twenty to about twenty-four hours, while the SNEA process typically requires the liquid sulfur to be recirculated through the spray jets for about twenty-four to about thirty hours.

Accordingly, there has existed a definite need for a degassification process that not only effectively reduces the $H_2S$ content of liquid sulfur, but is simple, requires a minimum amount of space, and is inexpensive. There has existed a further need for a process that takes a relatively short amount of retention time to achieve the desired liquid sulfur degassification. There has existed a still further need for a process that does not require incineration of the $H_2S$ gas released from the liquid sulfur. The present invention satisfies these and other needs, and provides further related advantages.

SUMMARY OF THE INVENTION

Now in accordance with the invention, there has been found a simple, effective and relatively inexpensive process employing a small apparatus for degassing liquid sulfur under pressure. A stream of liquid sulfur containing polysulfides and $H_2S$ and a stream of an oxidizing gas are introduced into a vessel under pressure and mixed, preferably by a static mixing device, to provide intimate contact between the gas and liquid streams. The mixture is then passed through the vessel at a pressure of at least about 40 psig, at a temperature and for a residence time sufficient to remove substantially all of the polysulfides and $H_2S$ from the liquid sulfur.

In some embodiments, the streams pass counter-currently through a vessel that also contains a catalyst for promoting the oxidation of the polysulfides and $H_2S$ to elemental sulfur. In preferred embodiments, the vessel is loaded with a bed of Claus catalyst or Claus-like catalyst, such as titanium dioxide, Selectox, etc. The streams are maintained at a pressure of from about 55 to about 75 psig and at a temperature from about 265° F. to about 285° F., for a residence time less than about 30 minutes to produce degassed liquid sulfur containing less than about 30 ppmw total $H_2S$ content. Also in some embodiments, a liquid or gaseous catalyst for promoting the decomposition of polysulfides into $H_2S$ is introduced along with at least one of the streams. Suitable liquid or gaseous catalysts include ammonia, ammonium thiosulfate, urea, morpholine, an alkanol amine or mixtures thereof.

DETAILED DESCRIPTION OF THE PREFERRED EMBODIMENTS

Particular embodiments of the invention are described below in considerable detail for the purpose of illustrating its principles and operation. However, various modifications may be made, and the scope of the invention is not limited to the exemplary embodiments described below. For example, while specific reference is made to liquid sulfur produced by a Claus plant, it can be appreciated that the process is of equal utility in degassing liquid sulfur containing polysulfides and $H_2S$ produced from any source whatsoever.

Figure 1:
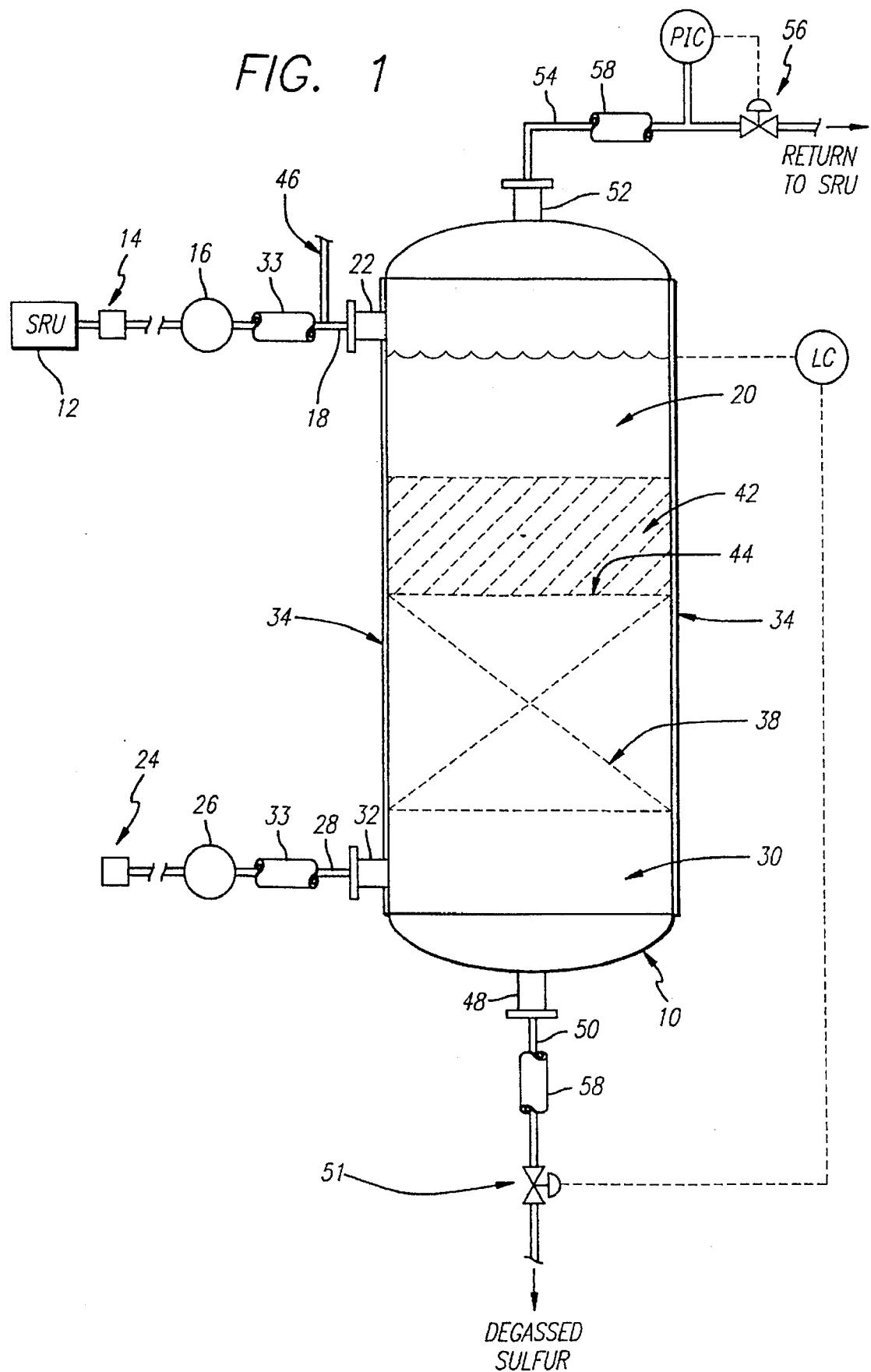
FIG. 1 shows a degassing vessel and certain related equipment for use in the process in accordance with the invention.

Turning now to FIG. 1, there is shown a vertically oriented degassing vessel 10 and certain related equipment for use in the process in accordance with the invention. The degassing vessel is made of any material, such as carbon steel, that is essentially inert to oxidizing gases, liquid sulfur, and the like and that can withstand internal pressures in excess of from about 55 to about 75 psig, or greater.

A stream of liquid sulfur containing polysulfides and $H_2S$ produced by a Claus sulfur recovery unit 12 and flowed into pit 14. The liquid sulfur is then pumped by liquid sulfur transfer pump 16 through piping 18 into the vessel 10. The liquid sulfur is introduced, at a pressure of at least about 40 psig, into the upper portion 20 of the vessel through a liquid sulfur inlet 22. Preferred pressures are from about 55 to about 75 psig, with a pressure of about 60 to about 65 psig being most preferred. It is an advantage of the process in accordance with the invention that the sulfur transfer or loading pumps used in conventional Claus plants for delivering liquid sulfur from the sulfur recovery unit to a liquid storage container or to a sulfur loading station for transport can produce a liquid sulfur stream having such pressures. Consequently, the conventional sulfur transfer or loading pumps are readily adaptable for use with the inventive process.

A stream of an oxidizing gas is pumped from air supply 24 by a compressor 26 through piping 28 into the vessel 10. The oxidizing gas is introduced, at a pressure of at least about 40 psig, into the lower portion 30 of the vessel through an oxidizing gas inlet 32. Preferred pressures for the stream of oxidizing gas are from about 55 to about 75 psig, with a pressure of about 60 to about 65 psig being most preferred. In an alternative embodiment, a source of air, at a pressure of 40 psig or greater, can be used without a dedicated compressor.

Any suitable oxidizing gas can be employed. Representative oxidizing gases include air, oxygen-enriched air, mixtures of gases containing oxygen, sulfur dioxide and sulfur dioxide-enriched gases. Air or oxygen-enriched air are preferred. It is another advantage of the process in accordance with the invention, that conventional Claus plants typically have high pressure instrument or utility air sources that are readily available and may be adapted to provide oxidizing gas having the desired pressure.

Piping 18 and 28 are surrounded by carbon steel jackets 33 which provide for the flow of steam or other suitable heating media between the piping and the outer jacket. This enables the streams to be heated to a temperature of from about 265° F. to about 285° F., preferably about 280° F., before they enter the vessel 10. The vessel, itself, is surrounded by a jacket 34; and a heating media circulated between the vessel and the jacket controls the temperature of the streams as they pass through the vessel.

As seen in FIG. 1, the liquid sulfur stream and the oxidizing gas stream pass counter-currently through the vessel 10. In alternative embodiments, the two streams pass co-currently or in a cross flow.

While in the vessel 10, the stream of liquid sulfur and the stream of oxidizing gas are mixed to provide intimate contact between the two streams and, generally, to form a substantially uniform mixture. In preferred embodiments, a gas/liquid contacting device 38 is used to intimately mix the two streams. In most preferred embodiments, the gas/liquid mixing device is a static mixing device. The static mixing device not only efficiently combines the streams, but, because, it contains no moving parts, it adds to the simplicity and low cost of the inventive process.

Figure 2:
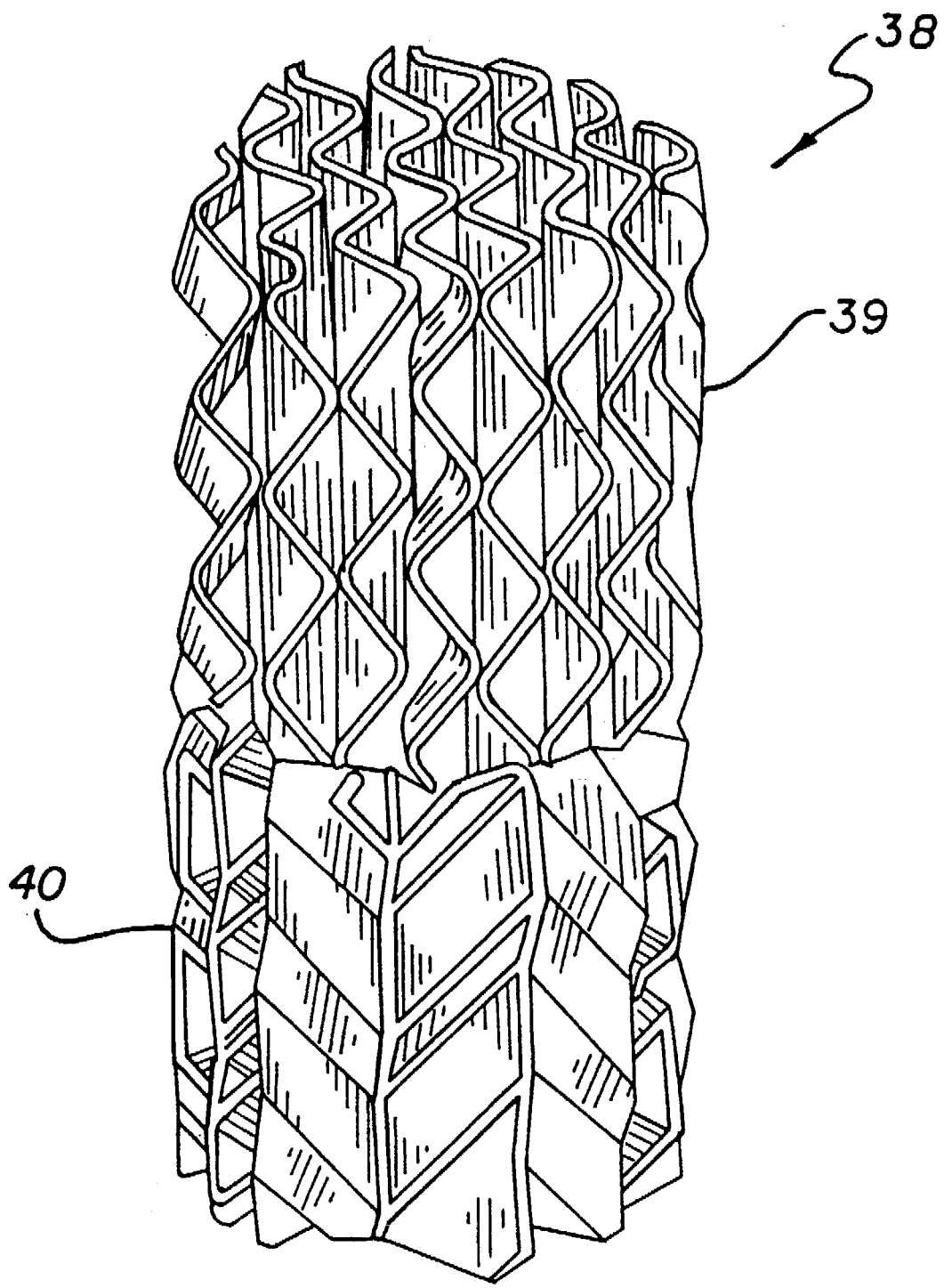
FIG. 2 is a perspective drawing, partially cut-away, showing a static mixing device for use in some embodiments of the process in accordance with the invention.

A representative static mixing device 38 is illustrated in FIG. 2. It consists of a series of stationary, rigid elements 39 placed lengthwise in the vessel. These elements form intersecting channels that split, rearrange, and recombine the component streams, until one uniform mixture exists. Adjacent mixing elements 40 are positioned 90° relative to each other so that three dimensional mixing occurs. Thus, three dimensional mixing ensures uniformity in composition, concentration, viscosity and temperature. Suitable static mixing devices are manufactured by Koch Engineering Co., Wichita, Kans. and Chemineer Kenics, North Andover, Mass.

The resulting mixture is then passed through the vessel at a pressure of at least about 40 psig, preferably from about 55 to about 75 psig, more preferably about 60 to about 75 psig. Pressures greater than about 40 psig result in a more efficient degassing reaction. This is because as the pressure increases, the partial pressure of the oxygen in the oxidizing gas increases, thereby enhancing the removal of $H_2S$ and polysulfides by causing their oxidation to elemental sulfur.

Accordingly, the upper limit of the pressure is set by the cost and availability of suitable high pressure equipment. Pressures less than about 40 psig can also be employed. However, lower pressures cause a loss in the efficiency of the degassing reaction leading to less complete degassing, longer residence times and/or larger equipment.

The mixture passed through the vessel at a temperature of about 265° F. to about 285° F., preferably about 280° F. The residence time in the vessel is sufficient to produce a stream of degassed liquid sulfur and a stream of $H_2S$-containing gas. It is a major advantage of the inventive process that the residence time is generally less than about one-half hour and, preferably, from about five to about twenty minutes. Residence time as used herein means the superficial or apparent residence time, i.e., the residence time assuming that the vessel is empty.

To further enhance the degassing reaction, the liquid sulfur and oxidizing gas streams are contacted with a catalyst for promoting the oxidation of polysulfides and $H_2S$ to elemental sulfur. Preferred catalysts include Claus catalysts. Claus catalysts are well known in the art. They are made of activated alumina in any suitable shape, such as spheres or pellets. Other suitable catalysts include Claus-like catalysts, such as titanium dioxide, Selectox (manufactured by Davisson Chemical Co.) and the like. The catalyst is loaded into the vessel in the form of a bed 42 supported on a horizontal screen 44 extending across the interior of the vessel. In an alternative embodiment (not shown), the catalyst bed is located in the bottom of the vessel, below the gas inlet 32.

In some embodiments, a liquid or gaseous catalyst for promoting the decomposition of polysulfides to $H_2S$ is added to one or both of the streams. In the embodiment shown in FIG. 1, the catalyst flows through piping 46 into piping 18, before the liquid sulfur stream is introduced into the vessel 10. Representative catalysts include ammonia, ammonium thiosulfate, morpholine, urea, alkanol amines, such as diisopropanol amine, and mixtures thereof.

After passing through the vessel 10, the degassed liquid sulfur exits through an outlet 48 into piping 50. The piping 50 includes a level control valve 51 for controlling the pressure of the liquid sulfur, as well as the level of the liquid sulfur in the vessel 10. The gases exit though an outlet 52 into piping 54. The piping 54 includes a valve 56 for controlling the pressure of the gases in the vessel. Because the gases exiting the vessel are at high pressure, typically, at pressures of from about 50 psig to about 75 psig, preferably about 60 psig, they can simply be recirculated back into the sulfur recovery unit 12. This eliminates the need for incinerating the $H_2S$-containing gases. Piping 50 and 54 are both surrounded by carbon steel jackets 58 providing for the flow of steam or other suitable heating media between the piping and the jacket. This enables the streams to be maintained at a predetermined temperature, e.g., a temperature of from about 265° F. to about 285° F., preferably, about 280° F., after they are discharged from the vessel.

It is another major advantage of the method in accordance with the invention that it results in the removal of substantially all of the total $H_2S$ from the initial liquid sulfur stream, where "total $H_2S$" means the total of both polysulfides and $H_2S$, by weight. Using the inventive process, the total $H_2S$ can be reduced to less than about 30 ppmw and, when desired, to less than about 10 ppmw. Furthermore, the degassing vessel is considerably smaller, simpler and less expensive than the stripping columns used in the Shell process and circulation/spraying equipment used in the SNEA process.

While the invention has been described in detail with reference to certain preferred embodiments thereof, it will be understood that modifications and variations are within the spirit and scope of that which is described and claimed.

I claim:

1. A process for degassing liquid sulfur containing polysulfides and hydrogen sulfide comprising the steps of:
   introducing under pressure a stream of liquid sulfur containing polysulfides and hydrogen sulfide and a stream of an oxidizing gas into a vessel;
   mixing the liquid stream and the gas stream to provide intimate contact between the two streams;
   passing the two streams while in intimate contact with one another through the vessel while maintaining a pressure of at least about 40 psig, at a temperature and for a treatment time sufficient to remove substantially all of the polysulfides and hydrogen sulfide from the liquid sulfur and to produce a stream of degassed liquid sulfur and a stream of gas; and
   discharging the thus degassed liquid sulfur from the vessel.

2. A process in accordance with claim 1 wherein the streams are intimately mixed with a gas/liquid contacting device.

3. A process in accordance with claim 1 further comprising the vessel contains a catalyst for promoting the oxidation of the polysulfides and hydrogen sulfide to elemental sulfur.

4. A process in accordance with claim 3 wherein the catalyst is a Claus or Claus-like catalyst.

5. A process in accordance with claim 4 wherein the catalyst is titanium dioxide or Selectox.

6. A process in accordance with claim 1 wherein the oxidizing gas is air or oxygen-enriched air.

7. A process in accordance with claim 6 wherein the liquid sulfur and the air streams are introduced under a pressure of at least about 55 to about 75 psig.

8. A process in accordance with claim 7 wherein the liquid sulfur and the air streams are introduced under a pressure of from about 60 to about 65 psig.

9. A process in accordance with claim 6 wherein the temperature is from about 265° F. to about 285° F.

10. A process in accordance with claim 9 wherein the temperature is about 280° F.

11. A process in accordance with claim 6 wherein the treatment time is less than about thirty minutes.

12. A process in accordance with claim 11 wherein the treatment time is from about five to about twenty minutes.

13. A process in accordance with claim 6 wherein the liquid sulfur stream and the oxidizing gas stream are passed counter-currently, co-currently or in a cross flow.

14. A process in accordance with claim 6 wherein the degassed liquid sulfur has a total hydrogen sulfide content of less than about 30 ppmw.

15. A process in accordance with claim 6 wherein the degassed liquid sulfur has a total hydrogen sulfide content of less than about 10 ppmw.

16. A process in accordance with claim 1 further comprising introducing a catalyst for promoting the decomposition of polysulfides into hydrogen sulfide along with at least one of the streams.

17. A process in accordance with claim 16 wherein the catalyst is selected from ammonia, ammonium thiosulfate, urea, morpholine, an alkanol amine and mixtures thereof.

18. A process in accordance with claim 1, further comprising the gas stream is discharged from the vessel at a pressure of from about 50 psig to about 75 psig.

19. A process in accordance with claim 1, further comprising the gas stream is discharged from the vessel and then combined with hydrogen sulfide containing gases in a sulfur recovery unit.

20. A process for degassing liquid sulfur containing polysulfides and hydrogen sulfide comprising the steps of:
   introducing under pressure a stream of liquid sulfur containing polysulfides and hydrogen sulfide and a stream of air or oxygen-enriched air into a vessel containing a static mixing device for intimately mixing the two streams and a catalyst for promoting the oxidation of the polysulfides and hydrogen sulfide to elemental sulfur;
   passing the streams through the static mixing device counter-currently, co-currently, or in a cross flow while maintaining a pressure of from about 55 to about 75 psig and at a temperature from about 265° F. to about 285° F. and for a treatment time less than about thirty minutes to produce a degassed liquid sulfur stream containing less than about 10 ppmw total hydrogen sulfide content and a stream of gas; and
   discharging the thus degassed liquid sulfur from the vessel.

21. A process in accordance with claim 20 wherein the catalyst is a bed of Claus or Claus-type catalyst.

22. A process in accordance with claim 21 wherein the catalyst is a bed of titanium dioxide or Selectox.

23. A process in accordance with claim 20 wherein the liquid sulfur and the air streams are introduced under a pressure of at least about 40 psig.

24. A process in accordance with claim 23 wherein the liquid sulfur and the air streams are introduced under a pressure of from about 55 to about 75 psig.

25. A process in accordance with claim 20 wherein the temperature is about 280° F.

26. A process in accordance with claim 20 wherein the treatment time is from about five to about twenty minutes.

27. A process in accordance with claim 20 wherein the liquid sulfur stream and the oxidizing gas stream are passed counter-currently through the static mixing device.

28. A process in accordance with claim 20 wherein the degassed liquid sulfur has a total hydrogen sulfide content of less than about 30 ppmw.

29. A process in accordance with claim 20 wherein the degassed liquid sulfur has a total hydrogen sulfide content of less than about 10 ppmw.

30. A process in accordance with claim 20 further comprising introducing along with at least one of the streams a catalyst for promoting the decomposition of polysulfides into hydrogen sulfide.

31. A process in accordance with claim 30 wherein the catalyst is selected from ammonia, ammonium thiosulfate, urea, morpholine, alkanol amines, and mixtures thereof.

32. A process in accordance with claim 20, further comprising the gas stream is discharged from the vessel at a pressure of from about 50 psig to about 75 psig.

33. A process in accordance with claim 20, further comprising the gas stream is discharged from the vessel and then combined with hydrogen sulfide containing gases in a sulfur recovery unit.

34. A process for degassing liquid sulfur containing polysulfides and hydrogen sulfide comprising the steps of:

introducing under pressure a stream of liquid sulfur containing polysulfides and hydrogen sulfide and a stream of an oxidizing gas into a vessel containing a static mixing device and a bed of a Claus or Claus-type catalyst;

counter-currently passing the streams through the static mixing device while maintaining a pressure of from about 65 to about 75 psig and a temperature from about 265° F. to about 285° F., for a treatment time of from about 5 to about 20 minutes to produce a degassed liquid sulfur stream containing less than about 30 ppmw total hydrogen sulfide content and a stream of gas; and discharging the thus degassed liquid sulfur from the vessel.

35. A process in accordance with claim 34 wherein the catalyst is titanium dioxide or Selectox.

36. A process in accordance with claim 34, further comprising the gas stream is discharged from the vessel at a pressure of from about 50 psig to about 75 psig.

37. A process in accordance with claim 34, further comprising the gas stream is discharged from the vessel and then combined with hydrogen sulfide containing gases in a sulfur recovery unit.

* * * * *